United States Patent

[11] 3,576,305

| [72] | Inventors | Robert Louis Welsh;<br>William Russell Bodine, Cherry Hill, N.J. |
|---|---|---|
| [21] | Appl. No. | 772,560 |
| [22] | Filed | Nov. 1, 1968 |
| [45] | Patented | Apr. 27, 1971 |
| [73] | Assignee | Omark Industries, Inc.<br>Portland, Oreg. |

[54] CABLE HANGER
3 Claims, 3 Drawing Figs.

[52] U.S. Cl............................................. 248/68,
24/73.7, 248/62
[51] Int. Cl................................................ F16l 3/22
[50] Field of Search........................................ 248/62, 68,
74, 65; 24/73.7

[56] References Cited
UNITED STATES PATENTS

| 429,357 | 6/1890 | McBee | 248/68 |
| 2,560,845 | 7/1951 | Carpenter | 248/68X |
| 2,840,629 | 6/1958 | Roth | 248/74X |
| 3,087,700 | 4/1963 | Carpenter | 248/74 |
| 2,964,274 | 12/1960 | Richardson | 248/68 |
| RE26,175 | 3/1967 | Wesseler | 248/68 |

FOREIGN PATENTS

| 85,723 | 8/1954 | Denmark | 248/68 |
| 1,048,227 | 11/1966 | Great Britain | 248/68 |

*Primary Examiner*—Chancellor E. Harris
*Attorney*—Charles F. Duffield

ABSTRACT: A cable hanger for banding and supporting a cable run which includes an elongate planar channel member having a bottom wall and two sidewalls. Two apertures are disposed centrally in the bottom wall of the channel member and the wall portion between the apertures is raised above the remaining bottom wall surface to provide a tunnel through which the band passes as it extends through the channel and around the cables to be secured. Partable hanger attachment means are secured to the raised portion of the bottom wall out of interference with the band and can thus support the channel member along its vertical axis. A compound bend is provided in the sidewalls of the channel member to reinforce the sidewalls.

PATENTED APR 27 1971 3,576,305

INVENTORS.
Robert L. Welsh
William R. Bodine
BY
Charles F. Duffield
ATTORNEY.

CABLE HANGER

SUMMARY AND OBJECTS OF INVENTION

This invention relates to supports for cables and pipes and the like and, more specifically, to improvements in cable hangers of the U or channel configuration used for banding and supporting cables extending transversely to the axis of the channel.

Various types of hangers have been proposed and used to secure conductors such as cables, pipes, ducts and the like. The various environments in which the hangers are used have resulted in different criteria for the various hangers. In the environment of ships and vehicles, the ability of the hanger to withstand shock and vibration and universality for different numbers and sizes of conductors are important factors.

Over the past few years, a cable hanger has come into use in the shipbuilding industry which employs a flexible metal band which passes through a U-shaped or channel member which is disposed transversely to the axis of the cables being supported. Such a cable hanger is disclosed in U.S. Pat. Re 26,175. One of the disadvantages found with this type cable hanger is that the supporting structure for the hanger is secured at one wall of the channel member and thus offset to one side of the centerline of the hanger. During conditions of extreme vibration and shock, this offset from the centerline of the hanger has caused excessive moments and failure of the hanger.

Another design of cable hanger of this general type which has found some use in the shipbuilding industry is that disclosed in U.S. Pat. 2,964,274. This cable hanger employs a square tubing member in place of the U-shaped channel in the design of the cable hanger above described. In this cable hanger, the flexible banding passes through the square tube and around the cables which are disposed transversely to the long axis of the tube. The advantages of this cable hanger are that the hanger attachment means may be placed on one of the walls of the square tube directly in line with the vertical axis of the hanger. In this manner, undo moments are avoided. Nevertheless, one of the disadvantages of this type of hanger is the added weight and cost of manufacture of the square tube.

Accordingly, it is an object of the present invention to provide a cable hanger which combines the low expense and ease of manufacture of the open-channel type hanger and, as well, the rigidity and strength of the mounting arrangement of the square-type cable hanger.

The foregoing object is carried out in the present invention by means of a cable hanger which includes a planar channel member defined by a bottom wall and two sidewalls extending from the bottom wall wherein two apertures are provided in the bottom wall extending between the sidewalls. Partable hanger attachment means are secured to the bottom wall between the two apertures and the sidewalls in alignment with the vertical axis of the hanger. During banding of the cables to the cable hanger, the flexible metal band is passed through the channel but underneath the hanger attachment means by way of the apertures provided in the bottom wall. In this way, the hanger attachment means can be positioned on the vertical axis of the cable hanger without interference with the band-securing means.

These and other objects of the present invention will become apparent from the following description thereof taken in conjunction with the drawings.

DETAILED DESCRIPTION OF INVENTION

Figure 1:
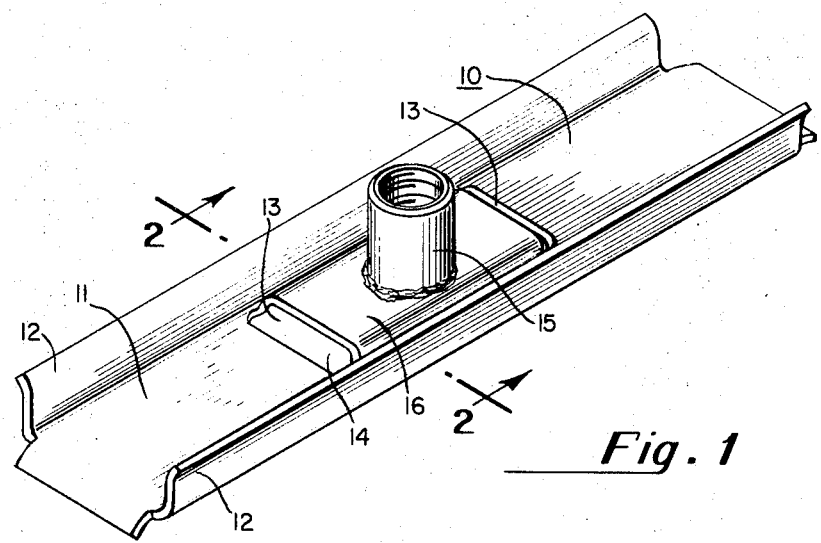
FIG. 1 is a perspective view of the cable hanger of the present invention.

Referring now to the drawings, the cable hanger of the present invention includes an elongate planar channel member 10. The channel member 10 is defined by a bottom wall 11 and two upwardly extending sidewalls 12.

Disposed inwardly from the ends of the channel member 10 are two apertures 13. The apertures are cut transversely to the long axis of the channel member and extend between the sidewalls.

Figure 2:
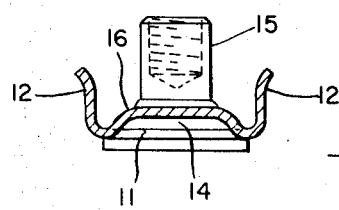

The portion of the bottom wall between the apertures 13 may be elevated above the remaining bottom wall to provide a tunnel 14 as best shown in FIG. 2.

An internally threaded stud 15 is stud welded to the raised bottom wall portion 16 at approximately the vertical axis of the channel member 10.

Figure 3:
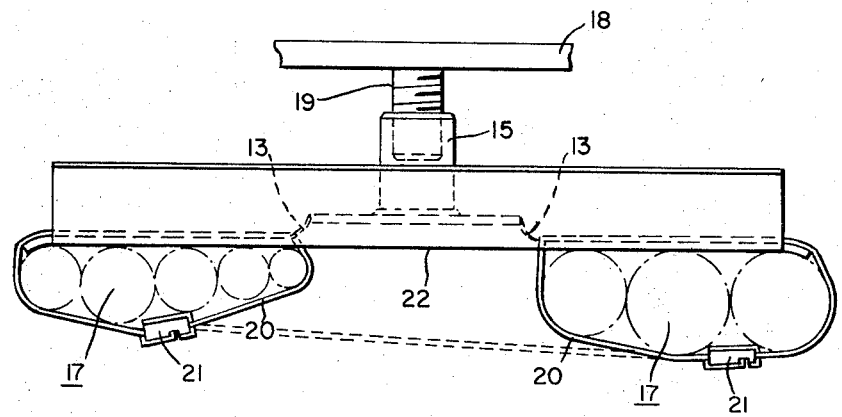
FIG. 2 is a sectional view of the cable hanger of FIG. 1 taken along lines 2-2 and FIG. 3 is a side view of the cable hanger of the present invention including cables held in place.

During use of the hanger, as best shown in FIG. 3, the channel member 10 will be disposed transversely to the axis of the cables 17 to be supported. The entire assembly will be supported from a ship deck or bulkhead 18 by means of an externally threaded stud 19 welded to the deck at one end thereof and its opposite end threaded into the stud 15.

The cables 17 are compressively banded to the cable hanger by a flexible band 20 which passes through the channel, through the apertures 13 and around the cables 17. The ends of the band are drawn tightly together and secured by a clamp 21.

In accordance with the invention, cables of greatly varying size may be generally divided into two groups with the larger cables in one group and the smaller cables in another. The cables of each group may be disposed either on the left or right side of the cable hanger and accordingly banded in groups generally according to their size.

If the cables are not of greatly varying size, then they may be banded together across the entire bottom surface 22 of the cable hanger by a band, shown in phantom, which will pass through the channel between the sidewalls 12 and underneath the hanger-supporting stud 15 by means of the tunnel 14.

The tunnel 14 and the central location of the stud 15 assures that the cable hanger and bound cables will be supported through the vertical axis of the cable hanger while at the same time the supporting structure does not interfere with the banding operation during which the flexible band is passed around the cables.

The sidewalls 12 of the cable hanger of the present invention, as best shown in FIG. 2, include a compound bend therein. This compound reinforces the sidewalls and prevents failure of the sidewalls due to bending moments in either direction along a vertical axis.

The foregoing invention has been described in reference to a particular embodiment thereof shown in the drawings. However, no limitation is thereby intended but instead the scope of the invention is to be interpreted within the spirit and scope of appended claims.

We claim:

1. A hanger for compressively banding and supporting a cable run comprising;

an elongate planer channel member defined by a planer bottom wall and two sidewalls projecting from said bottom wall, said member being adapted to extend transversely to the length of the cable run and having its bottom wall surface opposite said sidewalls adapted to supportably engage cables of the run, at least two apertures in said bottom wall surface extending between said sidewalls and transversely to the long axis of said bottom wall, partable hanger attachment means secured at one end by the stud end welding technique to said bottom wall between said sidewalls and said apertures of said channel member, and band-securing means extending axially through at least a portion of said channel by way of at least one of said apertures to compressively band the cables of said run whereby the hanger may be supported through the vertical axis of the hanger by the partable hanger means without interference with the band-securing means.

2. The hanger of claim 1 in which the bottom wall between said apertures is displaced in the direction of said sidewalls to provide a tunnel through which the band-securing means may pass beneath the partable hanger attachment means.

3. The hanger of claim 1 in which the sidewalls of said channel member include a compound bend therein to reinforce the sidewalls.